United States Patent [19]

Reytblatt

[11] 4,320,966

[45] Mar. 23, 1982

[54] FOURIER PROCESSOR OF PHOTOELASTIC DATA AND METHOD OF USING SAME

[76] Inventor: Zinovy V. Reytblatt, 3550 N. Lake Shore Dr., Chicago, Ill. 60657

[21] Appl. No.: 39,582

[22] Filed: May 16, 1979

[51] Int. Cl.³ .............................................. G01B 11/18
[52] U.S. Cl. .................................. 356/34; 350/162 SF
[58] Field of Search ........................... 356/33, 34, 35; 350/162 SF

[56] References Cited

U.S. PATENT DOCUMENTS

| | | | |
|---|---|---|---|
| 3,087,148 | 4/1963 | Ludewig | 356/33 |
| 3,313,204 | 4/1967 | Oppel | 356/34 |
| 3,544,197 | 12/1970 | Weaver | 350/162 SF |
| 3,902,805 | 9/1975 | Redner | 356/33 |
| 3,947,123 | 3/1976 | Carlson et al. | 350/162 SF |
| 4,008,960 | 2/1977 | Reytblatt | 356/34 |

Primary Examiner—R. A. Rosenberger

[57] ABSTRACT

In the reflection polariscope using filter with four elements transmitting light of four different wavelengths each polarized in appropriate plane and a photoelastic coating having a built-in dichroic filter an image is recorded. The record is further processed in the Fourier processor using special filters to obtain certain potentials and/or the averaged strains in the photoelastic coating and strains in the coating-prototype interface.

16 Claims, 5 Drawing Figures

FOURIER PROCESSOR OF PHOTOELASTIC DATA AND METHOD OF USING SAME

BACKGROUND OF THE INVENTION

1. Field of the Invention

This invention relates to the experimental stress analysis and more particularly to the optically assisted processing of photoelastic data.

2. Description of the Prior Art

In my previous invention U.S. Pat. No. 4,008,960 "Photoelastic Strain Gauge Coating and Method of Using Same" a standard photoelastic coating has been disclosed as a coating of standard shape and of standard boundary conditions (load-free boundary). The more detailed analysis of computations involved to separate strains, shows that the substantial computer time expenditures are inherent in the proposed technique. The bulk of these relates to the numerical convolution of certain functions obtained from the experiment. It is also shown in the papers: "Strain Separation in S.P.C.", Paper No. R79-160 and "Inversion Problem in Infinite S.P.C.", Paper No. R79-161 SESA Spring Meeting, 1979 by Z. Reytblatt that for the "infinite" coatings (that is the coatings whose bonded area is small compared to the total area) the averaged strains and the strains in the prototype-coating interface are certain convolutions.

The patent application "Polariscope and Filter Thereof" Ser. No. 038,575 discloses a method of obtaining images containing information on both principal stress difference and principal strain directions throughout the entire field of observation using filters containing a multiplicity of elements transmitting light of specified wavelengths and polarization planes. Semitransparent mirror films built in the slab of photoelastic materials, in general, are well known. However, the dichroic film application as a built-in film in photoelasticity has not been disclosed.

Devices capable of producing the Fourier transforms of given functions, their inverses and/or convolutions are well known (U.S. Pat. No. 3,544,197 "Optical Cross correlation", as an example).

OBJECTS AND SUMMARY OF THE INVENTION

Objects

One object of the present invention is to provide an apparatus and method of using same for strain measurements employing photoelastic coatings which rapidly and economically evaluates A- and B-potentials (which are defined below).

Another object of the present invention is to provide for the strain separation in the "infinite" photoelastic coatings.

Still another object of the present invention is the evaluation of the strains on a prototype surface in the area thereof bonded to the photoelastic coating.

SUMMARY OF THE INVENTION

The objects of this invention are partially realized by an apparatus which produces the image containing $$\bar{\tau}\cos2\theta = \int_0^h \tau(x,y,z)\cos2\theta dz \qquad (1)$$

and $$\bar{\tau}\sin2\theta = \int_0^h \tau(x,y,z)\sin2\theta dz \qquad (2)$$

or these quantities and, in addition to this, $$\bar{\tau}^1\cos2\theta = \int_{h^1}^h \tau(x,y,z)\cos2\theta dz \qquad (3)$$

and $$\bar{\tau}^1\sin2\theta = \int_{h^1}^h \tau(x,y,z)\sin2\theta dz \qquad (4)$$

where $\tau = \epsilon_1 - \epsilon_2$, $\epsilon_1$, $\epsilon_2$—are principal strains in the coating, x,y-are cartesian coordinates in the coating plane, the origin being located at the prototype-coating interface, z-axis being directed inward the coating, $\theta$ being an angle between the x-axis and the first principal strain $\epsilon^1$ (it is assumed that $\theta$ does not substantially rotate through the coating), h is the coating thickness and $h^1 < h$.

These objects are realized in full by an auxiliary apparatus convolving said functions and another specified functions.

DESCRIPTION OF THE PREFERRED EMBODIMENT

Figure 1:
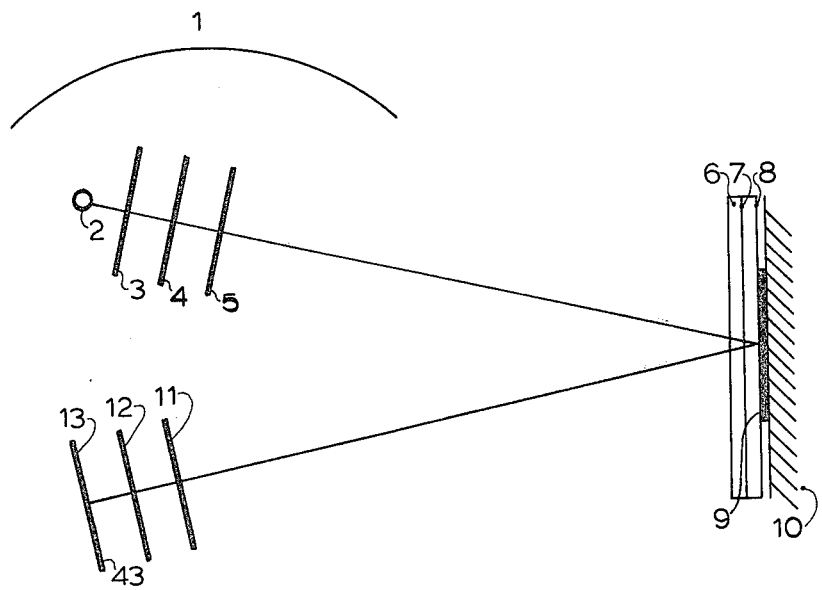
FIG. 1 is a functional diagram for obtaining a film record containing information on $\bar{\tau}, \bar{\tau}^1, \theta$.

FIG. 1 depicts a reflection polariscope 1 for the analysis of strains in prototype 10.

A polychromatic light beam from the source 2 passes through the filter 3 and lens 4 serving as a collimator.

Figure 2:
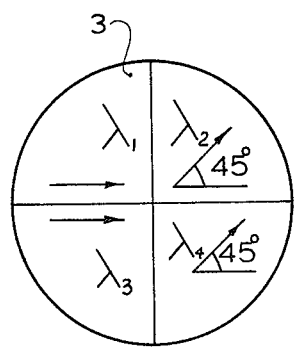
FIG. 2 depicts a filtering system of the apparatus shown in the FIG. 1.
Figure 3:
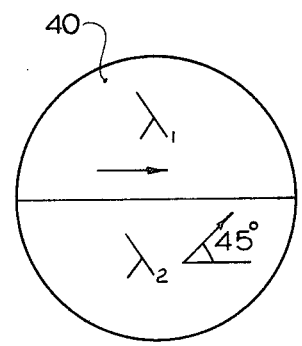
FIG. 3 shows a simplified filtering system of the apparatus depicted in the FIG. 1.

Filter 3 is depicted separately in the FIG. 2 and consists of four elements transmitting monochromatic light of four different wavelengths $\lambda_1$, $\lambda_2$, $\lambda_3$ and $\lambda_4$ these monochromatic rays being polarized, respectively, at 0°, 45°, 0°, 45° to the horizontal which is shown by the arrows in the FIG. 2.

We return now to the FIG. 1. The light passes through the phase plate 5 which for the convenience of the further discussion has an effect of a strain $\epsilon_{xx}$ of the magnitude corresponding to 0.15 of the fringe order for the shortest of the waves, superimposed on the strain field in the coating 6. The phase plate 5 is optional and can be eliminated if $\tau$ is positive (or negative) throughout the field of observation due to either prestress of the coating 6 prior to bonding it to the prototype 10 or due to the nature of loading.

The thickness h of coating 6 is chosen as to the optical effect corresponding to the expected maximum strain would not exceed 0.15 of the fringe order for the shortest of the waves used in the experiment and this restriction can be relaxed for $h^1 < h$. This insures that all the intensities being dealt with below represent positive (or negative) functions and that $0 < \tau < 0.3$. For different problems and materials h may vary from 0.0001" to 0.5".

After passing through the depth $h - h^1$ of coating, the light beam encounters a dichroic filter 7 which transmits the rays of wavelengths $\lambda_3$ and $\lambda_4$ and reflects the rays of wavelengths $\lambda_1$ and $\lambda_2$. It is preferable that $\lambda_1$ and $\lambda_2$ were less than $\lambda_3$ and $\lambda_4$ because the latter rays have the longer path in the coating. The rays of wavelengths $\lambda_3$ and $\lambda_4$ are reflected by a mirrored rear surface 8 of the coating 6 or by the surface of the prototype 10.

The reflected rays pass again through the coating 6, filter 11, which may be the same as the filter 3 but is rotated by 90° and and through the lens 12 forming an image 13 on a receiving surface 43 which is recorded.

Due to the orientation of axes of polarization in filters 3 and 11, the intensities of the record 13 (which may be a photographic film) in colors corresponding to the wavelengths $\lambda_1, \lambda_2, \lambda_3, \lambda_4$ are, respectively, $k_1 \tau \sin 2\theta$, $k_2 \tau \cos 2\theta$, $k_3 \tau^1 \sin 2\theta$ and $k_4 \tau^1 \cos 2\theta$, where $k_1, k_2, k_3$ and $k_4$ are certain constants. It is implied here that $\theta$ does not rotate through the coating thickness and that $\sin \tau \simeq \tau$ which is provided by the condition $0 < \tau < 0.3$.

To facilitate comprehension of the further processing of the information contained in the record 13 a brief extraction from the papers: "Strain Separation in S.P.C.", Paper No. R79-160 and "Inversion Problem in Infinite S.P.C", Paper No. R79-161 SESA Spring Meeting, 1979 by Z. Reytblatt is necessary. An asterisk is used to indicate a Fourier transform of a given function $f(x,y)$ into a Fourier plane $\xi, \eta$ so that $$f^*(\xi,\eta) = \frac{1}{2\pi} \int_{-\infty}^{\infty} \int_{-\infty}^{\infty} f(x,y) e^{-i(x\xi + y\eta)} dx dy \quad (5)$$

$$f(x,y) = \frac{1}{2\pi} \int_{-\infty}^{\infty} \int_{-\infty}^{\infty} f^*(\xi,\eta) e^{i(x\xi + y\eta)} d\xi d\eta \quad (6)$$

Then, in every plane z=constant of the "infinite" coating the following equations take place:

$$\epsilon^* = \cos 2\beta (\tau \cos 2\theta)^* + \sin 2\beta (\tau \sin 2\theta)^* \quad (7)$$

$$2\omega^* = \cos 2\beta (\tau \sin 2\theta)^* - \sin 2\beta (\tau \cos 2\theta)^* \quad (8)$$

$$(\tau \cos 2\theta)^* = \epsilon^* \cos 2\beta - 2\omega^* \sin 2\beta \quad (9)$$

$$(\tau \sin 2\theta)^* = 2\omega^* \cos 2\beta + \epsilon^* \sin 2\beta \quad (10)$$

where $\epsilon$ is a plane dilatation, $\epsilon = \epsilon_1 + \epsilon_2$, $\omega$ is a component of rotation normal to the coating plane, $\beta = \arccos(\xi/\rho)$, $\rho = (\xi^2 + \eta^2)^{\frac{1}{2}}$. The same equations hold for $\tilde{\tau}, \tilde{\tau}^1$, $\epsilon, \epsilon^1, \tilde{\omega}, \tilde{\omega}^1$ where $\tilde{\epsilon}, \tilde{\omega}, \tilde{\epsilon}^1, \tilde{\omega}^1$ are the integrals of $\epsilon, \omega$ over the ranges from 0 to h and from $h^1$ to h, respectively.

Figure 4:
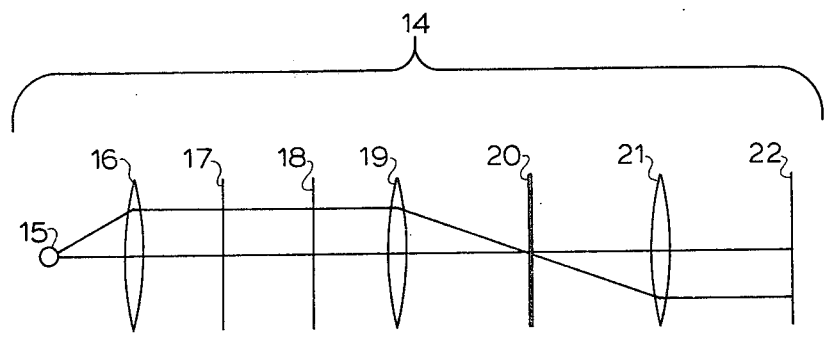
FIG. 4 is a functional diagram of a Fourier processor for obtaining averaged through the coating depth strains and/or strains in the coating-prototype interface.

It can also be proven that at the interface $z=0$ the following equations take place:

$$\omega^*(\xi,\eta,0) = t \coth(t) \tilde{\omega}^*(\xi,\eta)/h \quad (11)$$

$$\epsilon^*(\xi,\eta,0) = a(t)\tilde{\epsilon}^*/h + a_1(t)(\tilde{\epsilon}^1)^*/h \quad (12)$$

where $t = \rho h$, and $a(t), a_1(t)$ are certain functions. We return now to the FIG. 4 depicting an auxiliary apparatus 14 typical for Fourier processing of the record 13 obtained in in the polariscope 1 to complete the second step of strain analysis.

The coherent light beam from the pinhole 15 (or from the laser apparatus; in this case either the apparatus must be capable to produce monochromatic light of varying wavelength or four different apparati are provided producing light of wavelengths $\lambda_1, \lambda_2, \lambda_3, \lambda_4$) is collimated by the lens 16.

Then the beam passes through the slide 17 corresponding to the record 13 and, if necessary, a filter 18 transmitting wavelength $\lambda_i$ only, where $i = 1,2,3,4$. Thus, the electric vector of the transmitted light is proportional to $f(x,y) = \tau \text{trig} 2\theta$ or to $f(x,y) = \tau^1 \text{trig} 2\theta$ where trigx is either sin x or cos x.

Figure 5:
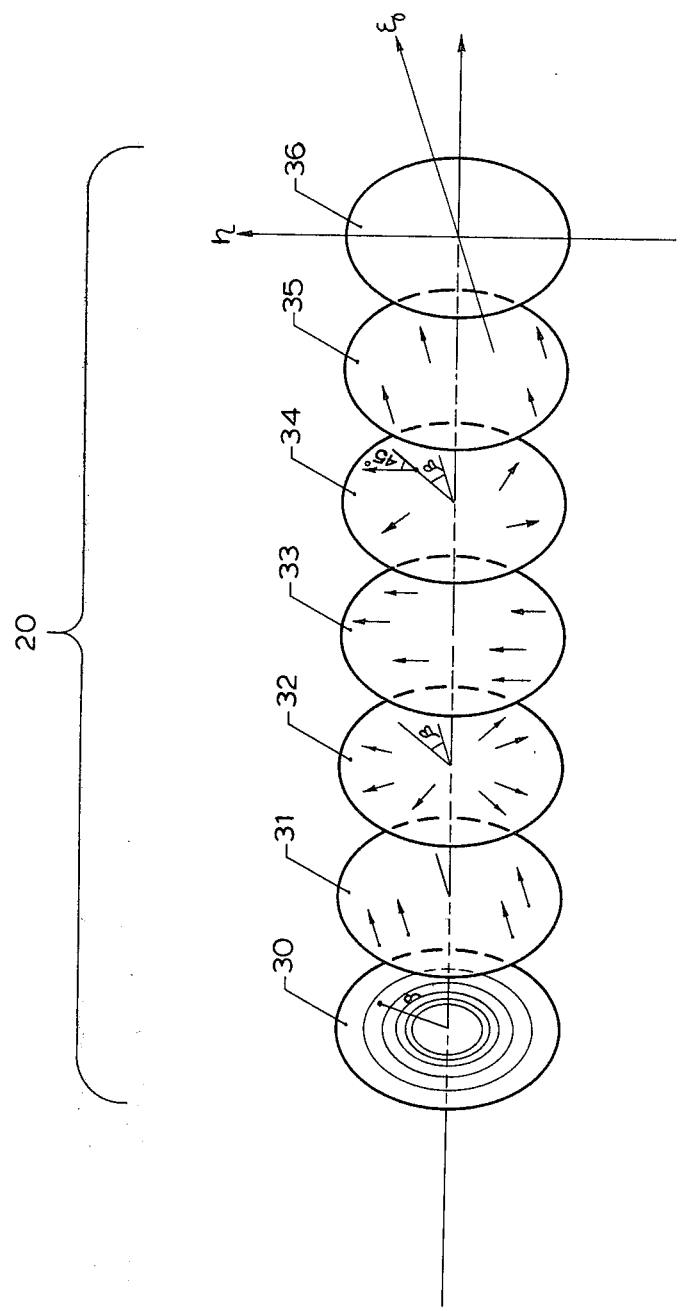
FIG. 5 is a functional diagram of a filter of the Fourier processor depicted in the FIG. 4.

In the focal plane of lens 19 where the Fourier transform $f^*(\xi,\eta)$ of the function $f(x,y)$ is formed there is a filter 20 shown in details in the FIG. 5, which multiplies said transform by $F(t) \text{trig} 2\beta$ or by $F(t) \text{trig} 2\beta \text{trig} 2\beta$. This effect is discussed below in more details; $F(t)$ is a certain function.

The lens 21 located one its focal distance farther on the optical axis inverses the product and the inverse can be either observed on the screen 22 or scanned or recorded on the plate or film.

The constant factors depending on the material properties and thickness of the coating, filter transmittance etc. being established by calibration the images on the screen 22 represent the original functions $\{L(x,y)\}$ whose Fourier transforms are $F(t) \text{trig} 2\beta f^*(\xi,\eta)$ or $F(t) \text{trig} 2\beta f^*(\xi,\eta) \text{trig} 2\beta$. Thus, if $F(t)$ represents either tcoth t or $a(t)$ or $a_1(t)$ the array $\{L(x,y)\}$ generated as a result of an appropriate number of experiments described above with the image 13 for different wavelengths, different trig-functions and different $F(t)$ will contain according to the formulas (7)–(12) all the functions necessary to determine the strain components by scaling, addition and/or subtraction of said functions. For example, if $$L_1(x,y) = \frac{1}{2\pi} \int_{-\infty}^{\infty} \int_{-\infty}^{\infty} e^{i(x\xi + y\eta)} t \coth(t) \cos 2\beta (\tilde{\tau} \sin 2\theta)^* d\xi d\eta \text{ and}$$

$$L_2(x,y) = \frac{1}{2\pi} \int_{-\infty}^{\infty} \int_{-\infty}^{\infty} e^{i(x\xi + y\eta)} t \coth(t) \sin 2\beta (\tilde{\tau} \cos 2\theta)^* d\xi d\eta$$

then $$\omega(x,y,0) = L_1(x,y) - L_2(x,y)$$

Thus the present invention enables one to determine $\epsilon, \tau \cos 2\theta, \tau \sin 2\theta$ and $\omega$ on the surface of the prototype and/or the strains averaged over the coating depth for the case of an "infinite" photoelastic coating.

We return now to the FIG. 5 depicting a filter 20 for the producing $\cos 2\beta \sin 2\beta F(t) f^*(\xi,\eta)$ where $F(t)$ is a given function and $f^*(\xi,\eta)$ is formed in the plane of filter 20. The fact that the described simple Fourier transformer 19 may produce $f^*(-\xi,-\eta)$ has no bearing because the factors $F(t)$ and $\text{trig} 2\beta$ are symmetrical regarding the optical axis. Layers 30–35 of the filter 20 are assumed to be infinitesimal which practically can be achieved using thin film technology. Said layers are very closely spaced or bonded together or coated over as thin films. However, they are shown apart in the FIG. 5 to facilitate the explanation of their performance.

The layer 30 is a density filter whose transmittance is proportional to the function F(ρh), where ρ is a distance from the given point of the layer 30 to the optical axis. The amplitude of the light electric vector at the point $(\xi,\eta)$ after the ray passes the layer 30 will be $F(t)f^*(\xi,\eta)$.

The polarizing filter 31 whose polarization plane is horizontal and contains the optical axis, transmits only the horizontal component of the electric vector.

The next polarizing filter 32 at each point thereof polarizes light in a plane containing this point and the optical axis which is indicated by arrows. Thus, the vertical component of the electric vector after the ray passes the filter 32 will be proportional to $\sin \beta \cos \beta F(t)f^*(\xi,\eta)$ or to $\sin 2\beta F(t)f^*(\xi,\eta)$.

This component is separated by the polarizing filter 33 whose polarization plane is vertical which is indicated by arrows.

Similarly, the filter 34 at each point thereof the polarization plane is parallel to the optical axis and is inclined counterclockwise (or clockwise) at 45° to the radius at given point $(\xi,\eta)$ which is indicated by arrows, transforms the electric vector as to its horizontal component will be proportional to $\sin (45°+\beta) \cos (45°+\beta)F(t)f^*(\xi,\eta) \sin 2\beta$ or to $\cos 2\beta \sin 2\beta F(t)f^*(\xi,\eta)$.

This horizontal component is separated by the filter 35 whose polarization plane is horizontal as indicated by the arrows.

The filters 35,34,33,32,31,30 may be coated in the stated order on the transparent substrate 36.

If the filter 34 is changed to another filter identical to the filter 31 then the composite filter 20 will produce $\sin^2 2\beta F(t)f^*(\xi,\eta)$.

If the filter 31 is changed to the filter identical to the filter 34 then the composite filter 20 will produce $\cos^2 2\beta F(t)f^*(\xi,\eta)$.

If there are no filters 34 and 35 the composite filter 20 produces $\sin 2\beta F(t)f^*(\xi,\eta)$.

If there are no filters 31 and 32 the composite filter 20 produces $\cos 2\beta F(t)f^*(\xi,\eta)$.

When the photoelastic coating dimensions are of the same order as the dimensions of its bonded to prototype area the array {L(x,y)} relates to A- and B-potentials defined as follows:

$$A(x,y) = \frac{1}{\pi} \iint_\Omega \tilde{\tau} \cos 2(\theta - \phi) r^{-2} dx_1 dy_1 \quad (13)$$

$$B(x,y) = \frac{1}{\pi} \iint_\Omega \tilde{\tau} \sin 2(\theta - \phi) r^{-2} dx_1 dy_1 \quad (14)$$

Here, $\Omega$ is the domain of the photoelastic coating, $r = ((x-x_1)^2+(y-y_1)^2)^{\frac{1}{2}}$, $\phi = \arc \cos ((x-x_1)/r)$. Namely, the same combination of L-functions that would yield $\tilde{\epsilon}$ for an "infinite" coating in this case produces an A-potential, and the combination of L-functions that would yield $\tilde{\omega}$ for the "infinite" coating will produce the B-potential. This information greatly reduces computations needed for the strain separation using photoelastic coatings.

If only $\tilde{\epsilon}$ and $\tilde{\omega}$ or A- and B-potentials are the subject of analysis a simplified embodiment of the present invention will suffice. In this embodiment instead of the filter 3 a filter 40 transmitting the rays of two different wavelengths their polarization planes comprising a 45 angle is used and instead of the filter 11 another filter 40 rotated by 90 is applied. The photoelastic coating 6 may have no dichroic filter. The filters 20 needed in this embodiment are only those which produce $\sin 2\beta f^*(\xi,\eta)$ and $\cos 2\beta f^*(\xi,\eta)$.

If the material properties of the prototype and/or some additional information on the coating deformation is available still another (third) embodiment is capable to produce L-functions needed for the determination of strains on the prototype surface. Said third embodiment is essentially the same as the simplified (second) embodiment regarding the reflection polariscope 1 and the photoelastic coating 6 and is essentially the same as the first embodiment regarding the filters 20 of the Fourier processor 14.

What I claim as my invention is:

1. A method for optical determination of A- and B-potentials, and strains and rotation averaged over the depth of photoelastic coating bonded to the prototype, and of strains and rotation on the surface of said prototype by bonding said photoelastic coating to said prototype said coating comprising a slab of photoelastic material and first filtering means and reflecting means, said first filtering means being dichroic films being built in said slab; loading said prototype thus inducing strains therein; projecting a first beam of light containing at least two components polarized in different planes the wavelengths of said components being essentially different toward said photoelastic coating;

transmitting first components of said first beam of light and reflecting second components of said first beam of light using said first filtering means;

reflecting said first components of said first beam of light from said reflecting means of said photoelastic coating; filtering said first and second components of said first beam of light returning from said photoelastic coating in planes substantially perpendicular to the initial planes of polarization of said first and second components of said first beam of light; recording permanently a first optical image thus created; projecting second beams of collimated coherent monochromatic light of wavelengths of components of said first beam of light toward said permanent first optical image;

placing in the optical path of said second beams of light from said first optical image a first lens creating second images in the focal plane of said first lens said second images representing the Fourier transforms of functions represented by the color densities of said first optical image;

filtering said second beam of light from said second images using second filtering means placed in the optical path of said second beams, their center being on optical axis, said second filtering means comprising a sequence of a density filter and a multiplicity of polarizing filters each of said polarizing filters having the inclined at 0° and 45° to radius orientation of a polarization plane at any given point thereof, said second filtering means producing third images representing the products of the Fourier transforms of the functions represented by the color intensities of said first optical image by certain functions of the distance from the center of said second filtering means to a given point thereof, and by trigonometric functions of an angle between a straight line connecting said given point to the center of said second filtering means and the horizontal;

placing a second lens in the optical path of said second beams of light, said second lens receiving the light from the said third image and projecting said second beams of light toward suitable receiving means recording thus created permanent fourth optical images, said fourth optical images representing the Fourier inversions of functions represented by the said third images;

scanning and measuring densities of said fourth images; scaling, adding and subtracting the functions represented by said intensities of said fourth images, whereby to obtain said potentials, said strains and said rotations.

2. In a claim 1 said first beam of light contains two different wavelength components, said component polarization planes comprising an angle of 45°.

3. In the claim 1 said first beam of light contains four components of different wavelengths the first and second components thereof being polarized in horizontal plane, the third and the fourth components thereof being polarized at 45° to the horizontal and the said first filtering means transmitting said first component and said third component thereof and said first filtering means reflecting said second component and said fourth component thereof.

4. In a claim 1 said first beam of light passes a retardation plate appropriately oriented and located.

5. In a claim 1 said photoelastic coating has an initial uniform retardation of the magnitude of 0.1–0.3 of the fringe order for the shortest of the wavelengths of the components of said first beam of light.

6. A photoelastic coating including an inner layer of photoelastic material and an outer layer of photoelastic material said layers being separated by a dichroic film providing reflection of the rays of shorter wave lengths and providing transmission of the rays of longer wave lengths, thicknesses of said layers being of the same order of magnitude.

7. In a Fourier processor, the composite filter for multiplication of Fourier transforms of first functions represented by densities of records of images representative of strains in a prototype said images obtained by using a reflection polariscope and a photoelastic coating bonded to said prototype, by second positive functions and by third trigonometric functions, comprising first layer, the density of said first layer representing a second function, and a sequence of second layers having polarization planes inclined at 0° and 45° to the radii connecting each point thereof to the center, and a third layer being a transparent substrate.

8. In a claim 7 the density of said first layer is such that the resulting from processing strains are correct when transversal surface displacements of said prototype are negligible.

9. In a claim 7 the density of said first layer is such that the resulting from processing strains are correct when the stress component normal to the surface of said prototype averaged over the depth of said coating is negligible.

10. In a claim 7 the density of said first layer is such that the resulting from processing strains are correct when only shear forces exist at the interface of said coating and said prototype.

11. In a claim 7 the density of said first layer is proportional to a product of a distance from a given point thereof to the optical axis by the hiperbolic cotangent of said distance.

12. In a claim 7 a sequence of second layers comprises the first polarizing film polarization plane direction at each point thereof being horizontal, the second polarizing film polarization plane at each given point thereof containing the optical axis and a straight line connecting said given point to the optical axis, and the third polarizing film polarization plane direction at each point of said third polarizing film being vertical.

13. In a claim 7 a sequence of second layers comprises the first polarizing film polarization plane direction at each point thereof being horizontal, the second polarizing film polarization plane at each given point thereof being parallel to the optical axis and inclined at 45° clockwise to the straight line connecting said given point to the optical axis, and the third polarizing film polarization plane direction at each point of said third polarizing film being vertical.

14. In a claim 12 a sequence of said second layers comprises the fouth polarizing film identical to the said second polarizing film and a fifth polarizing film identical to said first polarizing film.

15. In a claim 13 a sequence of said second layers comprises the fourth polarizing film identical to the said second polarizing film and a fifth polarizing film identical to said first polarizing film.

16. In a claim 12 a sequence of said second layers comprises a fourth polarizing film polarization plane of each given point thereof being parallel to the optical axis and inclined at 45° clockwise to the straight line connecting said given point to the optical axis and a fifth polarizing film identical to said first polarizing film.

* * * * *